US008237079B2

(12) United States Patent
Lochner et al.

(10) Patent No.: US 8,237,079 B2
(45) Date of Patent: Aug. 7, 2012

(54) ADJUSTABLE PLASMA SPRAY GUN

(75) Inventors: Christopher Joseph Lochner, Albany, NY (US); Joseph Garfield Albanese, Rotterdam Junction, NY (US); Donald Joseph Baldwin, Galway, NY (US); Yuk-Chiu Lau, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 603 days.

(21) Appl. No.: 12/551,661

(22) Filed: Sep. 1, 2009

(65) Prior Publication Data

US 2011/0049110 A1 Mar. 3, 2011

(51) Int. Cl.
*B23K 9/00* (2006.01)

(52) U.S. Cl. ......... 219/121.47; 219/121.52; 219/121.75; 219/76.16

(58) Field of Classification Search .................... 219/75, 219/76.16, 121.45-57
See application file for complete search history.

(56) References Cited

U.S. PATENT DOCUMENTS 4,445,021 A * 4/1984 Irons et al. ............... 219/121.48
4,649,257 A * 3/1987 Yakovlevitch et al. .... 219/121.5
4,788,402 A 11/1988 Browning
4,841,114 A 6/1989 Browning
4,916,273 A 4/1990 Browning
4,924,059 A * 5/1990 Rotolico et al. ......... 219/121.48
5,008,511 A 4/1991 Ross
5,225,652 A 7/1993 Landes
5,332,885 A 7/1994 Landes
5,406,046 A 4/1995 Landes
5,444,209 A * 8/1995 Crawmer et al. ........ 219/121.52
5,452,854 A * 9/1995 Keller ............................ 239/80
5,556,558 A 9/1996 Ross et al.
6,068,201 A * 5/2000 Hawley et al. .................. 239/69
6,114,649 A 9/2000 Delcea
6,202,939 B1 3/2001 Delcea
6,392,189 B1 5/2002 Delcea
6,559,407 B2 * 5/2003 Chancey et al. ......... 219/121.47
7,375,301 B1 * 5/2008 Noujaim .................. 219/121.47
7,578,451 B2 * 8/2009 Mueller ..................... 239/132.3
7,959,983 B1 * 6/2011 Farrar et al. ................... 427/422
8,030,592 B2 * 10/2011 Weidman ................. 219/121.47
2005/0077272 A1 * 4/2005 Fusaro et al. ............ 219/121.45
2006/0108332 A1 5/2006 Belashchenko
2008/0121624 A1 5/2008 Belashchenko et al.
2008/0251503 A1 * 10/2008 Noujaim .................. 219/121.47

OTHER PUBLICATIONS

Molz et al., "Better Performance of Plasma Thermal Spray", Advanced Materials and Processes, Aug. 2006, pp. 65-67.

* cited by examiner

*Primary Examiner* — Michael Lebentritt
(74) *Attorney, Agent, or Firm* — Hoffman Warnick LLC; Ernest G. Cusick

(57) ABSTRACT

An adjustable plasma spray gun apparatus is disclosed. In one embodiment, an adjustable plasma spray gun apparatus includes: a plasma spray gun body having a fore portion and an aft portion; and a first coupler configured to removably attach to the plasma spray gun body at the aft portion, the coupler including: a first portion having a first axial opening configured to removably attach to the plasma spray gun body at the aft portion; and a second portion having a second axial opening configured to removably attach to one of an electrode body or a second coupler.

20 Claims, 8 Drawing Sheets

100

| Plasma spray gun nozzle | Ratio of La/Ld | Arc Length (La)(in) | Divergence length (Ld)(in) | Overall nozzle length (in) | Maximum power (kW) |
|---|---|---|---|---|---|
| Nozzle 200 | 2.7 | 3.00 | 1.12 | 4.12 | 200 |
| Nozzle 150 | 1.6 | 2.06 | 1.25 | 3.31 | 150 |
| Nozzle 100 | 1.5 | 1.50 | 1.00 | 2.50 | 100 |
| Nozzle 50 | 0.9 | 0.79 | 0.90 | 1.69 | 50 |

FIG. 7

ADJUSTABLE PLASMA SPRAY GUN

BACKGROUND OF THE INVENTION

The subject matter disclosed herein relates to an adjustable plasma spray gun. Specifically, the subject matter disclosed herein relates to an adjustable plasma spray gun including at least one coupler.

Thermal spraying is a coating method wherein powder or other feedstock material is fed into a stream of heated gas produced by a plasmatron or by the combustion of fuel gasses. The hot gas stream entrains the feedstock to which it transfers heat and momentum. The heated feedstock is further impacted onto a surface, where it adheres and solidifies, forming a thermally sprayed coating composed of thin layers or lamellae.

One common method of thermal spraying is plasma spraying. Plasma spraying is typically performed by a plasma torch or gun, which uses a plasma jet to heat or melt the feedstock before propelling it toward a desired surface. Current plasma spray guns operate efficiently (e.g., over 60% efficiency) at one power mode (e.g., 75 kW) and in one position with respect to a specimen. Therefore, when spraying different surfaces and/or different specimens (e.g., at different power requirements), different plasma spray guns, arranged in different positions, may be necessary.

BRIEF DESCRIPTION OF THE INVENTION

Solutions for adjusting a plasma spray gun are disclosed. In one embodiment, an adjustable plasma spray gun apparatus includes: a plasma spray gun body having a fore portion and an aft portion; and a first coupler configured to removably attach to the plasma spray gun body at the aft portion, the coupler including: a first portion having a first axial opening configured to removably attach to the plasma spray gun body at the aft portion; and a second portion having a second axial opening configured to removably attach to one of an electrode body or a second coupler.

A first aspect of the invention provides an adjustable plasma spray gun apparatus including: a plasma spray gun body having a fore portion and an aft portion; and a first coupler configured to removably attach to the plasma spray gun body at the aft portion, the coupler including: a first portion having a first axial opening configured to removably attach to the plasma spray gun body at the aft portion; and a second portion having a second axial opening configured to removably attach to one of an electrode body or a second coupler.

A second aspect of the invention provides an adjustable plasma spray gun including: an electrode body housing an electrode; a plasma spray gun body having a fore portion and an aft portion, the aft portion having an axial opening configured to removably attach to one of the electrode or a first coupler; and the first coupler removably attached to the plasma spray gun body at the axial opening of the plasma spray gun body, the coupler including: a first portion having a first axial opening configured to removably attach to the plasma spray gun body; and a second portion having a second axial opening configured to removably attach to one of the electrode body or a second coupler.

A third aspect of the invention provides an adjustable plasma spray gun system comprising: an electrode body housing an electrode; a plasma spray gun body having a fore portion and an aft portion, the plasma spray gun body housing a nozzle and having an axial opening at the aft portion configured to removably attach to one of the electrode or a coupler; the coupler removably attached to the plasma spray gun body at the axial opening of the plasma spray gun body, the coupler including: a first portion having a first axial opening configured to removably attach to the plasma spray gun body at the aft portion; and a second portion having a second axial opening configured to removably attach to one of the electrode body or a second coupler.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which:

FIG. 7 shows a table including data about example nozzles used according to embodiments of the invention.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide for an adjustable plasma spray gun apparatus. During operation, plasma spray guns are typically mounted on a robotic arm or robotic apparatus. A specimen (e.g., a turbine blade) is typically mounted on a holder at a distance from the plasma spray gun's fore end (exit annulus). This distance is known as the "standoff distance." The standoff distance may be dictated in part by the type of specimen to be sprayed and the type of material to be applied. During operation, plasma spray leaves the gun's exit annulus and is propelled toward the specimen. Spraying different specimens, or different portions of the same specimen, may require using different plasma spray guns with different power levels. For example, in order to spray at a higher power level, a first plasma spray gun may be removed from the robotic arm and replaced with a larger (e.g., longer) plasma spray gun. While the larger plasma spray gun allows for plasma spraying at a higher power level, it may also require extensive operational modifications before it can begin spraying the specimen. For example, when the larger gun is mounted to the robotic arm previously configured for the smaller gun, the increased length of the larger gun means that the standoff distance is reduced. In this case, in order to maintain the proper standoff distance, the robotic arm may require adjusting (e.g., via reprogramming). This reprogramming step may be inconvenient to the operator and cause delays in the spraying process. Therefore, aspects of the present invention provide for an adjustable plasma spray gun that may efficiently adapt to different plasma spray power needs without the need to move (e.g., reprogram) the robotic arm or apparatus. Specifically, aspects of the present invention provide for an adjustable plasma spray gun that may extend and/or retract at an aft end.

Figure 1:
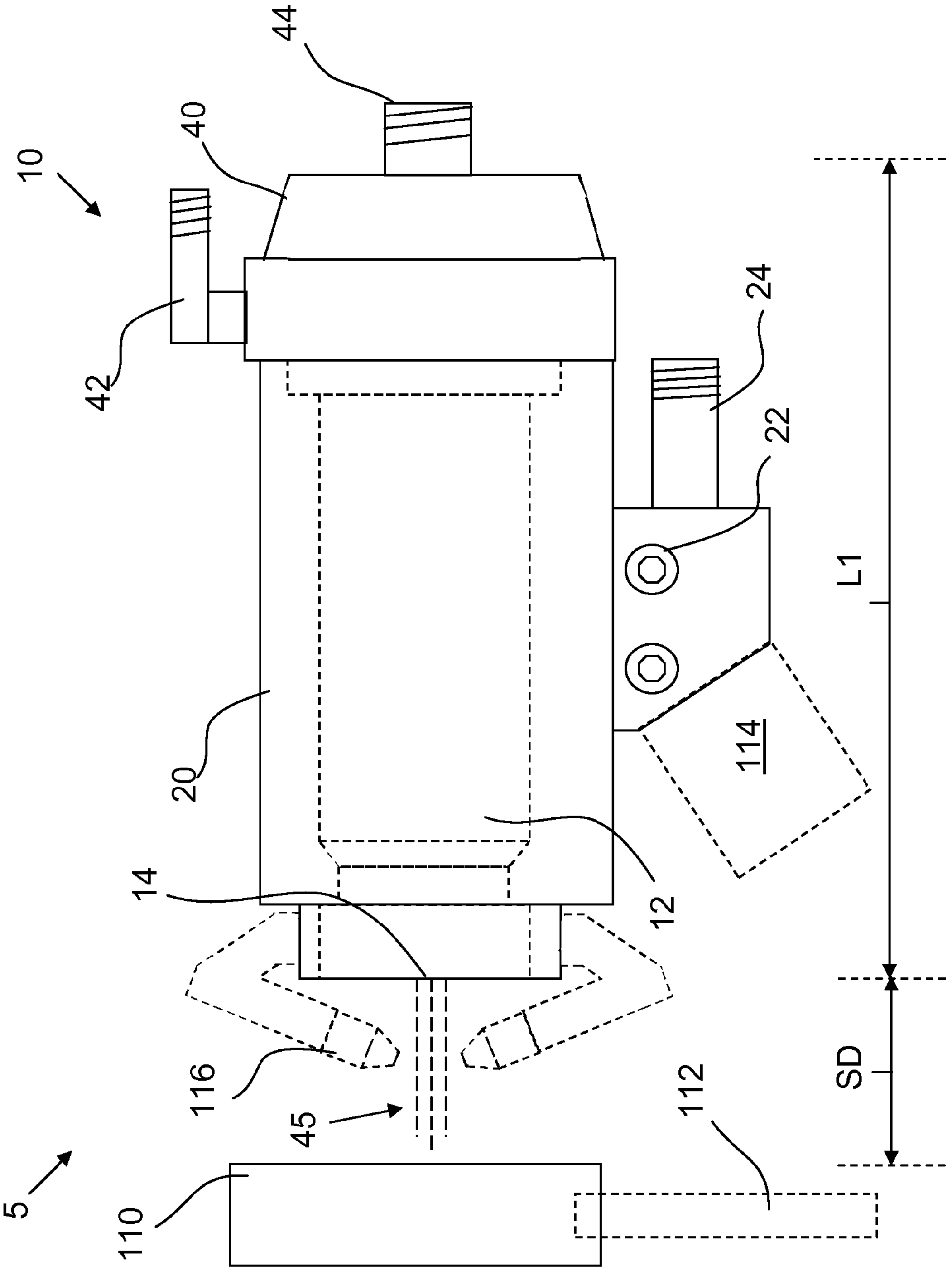
FIG. 1 shows a side view of a plasma spray gun system according to an embodiment of the invention.

Turning to FIG. 1, a plasma spray gun system 5 is shown including a adjustable plasma spray gun apparatus 10, a specimen 110, a specimen holder 112 (shown in phantom), a robotic arm 114 (shown in phantom) and one or more injector ports 116 (shown in phantom). Adjustable plasma spray gun apparatus 10 may include a plasma spray gun body 20, which may hold a plasma spray gun nozzle 12 (shown in phantom). Plasma spray gun body 20 and plasma spray gun nozzle 12 may share an exit annulus 14, and may be electrically connected. Plasma spray gun body 20 may further include one or more mounts 22 for attaching to robotic arm 114, and a port 24 for receiving and/or expelling water from an external source (not shown). Port 24 may also connect to an external electric power supply (not shown). Plasma spray gun body 20 may be removably attached to an electrode body 40 at one portion, however, plasma spray gun body 20 is electrically insulated from the electrode housed within electrode body. Electrode body 40 may include a plasma gas port 42 for receiving a plasma gas from an external source (not shown), and a port 44 for receiving and/or expelling water from an external source (not shown). Port 44 may also connect to an external electric power supply (not shown). Descriptions of external water, electric power and gas supplies, as well as cooling systems, are omitted herein, and function substantially similarly to those known in the art. Plasma spray gun apparatus 10 may have a length L1, which may include the distance from approximately the aft end of electrode (farthest end from specimen 110) to exit annulus 14. The distance between exit annulus 14 and specimen 110 is shown as the standoff distance SD. As further described herein and illustrated in the Figures, plasma spray gun system 5 may allow for spraying one or more specimens 110 at different power levels while maintaining a fixed standoff distance SD.

During operation of plasma spray gun system 5, an arc is formed inside electrode body 40 and plasma spray gun body 20, where electrode body 40 acts as a cathode electrode and plasma spray gun body 20 acts as an anode. Plasma gas is fed through plasma gas port 42, and extends the arc to exit annulus 14, where injector ports 116 may supply feedstock material into a plasma jet stream 45 as it leaves plasma spray gun body 20 and plasma spray gun nozzle 12 via exit annulus 14. Injector ports 116 may allow for radial supply of feedstock into plasma jet stream 45. Feedstock may be, for example, a powder entrained in a carrier gas and/or a suspension solution. However, feedstock used in the embodiments described herein may be any feedstock material used in plasma spraying. Plasma jet stream 45, including feedstock, is then propelled toward specimen 110, thereby coating it. Standoff distance SD is designed so as to optimize spraying conditions for a particular specimen 110.

Figure 2:
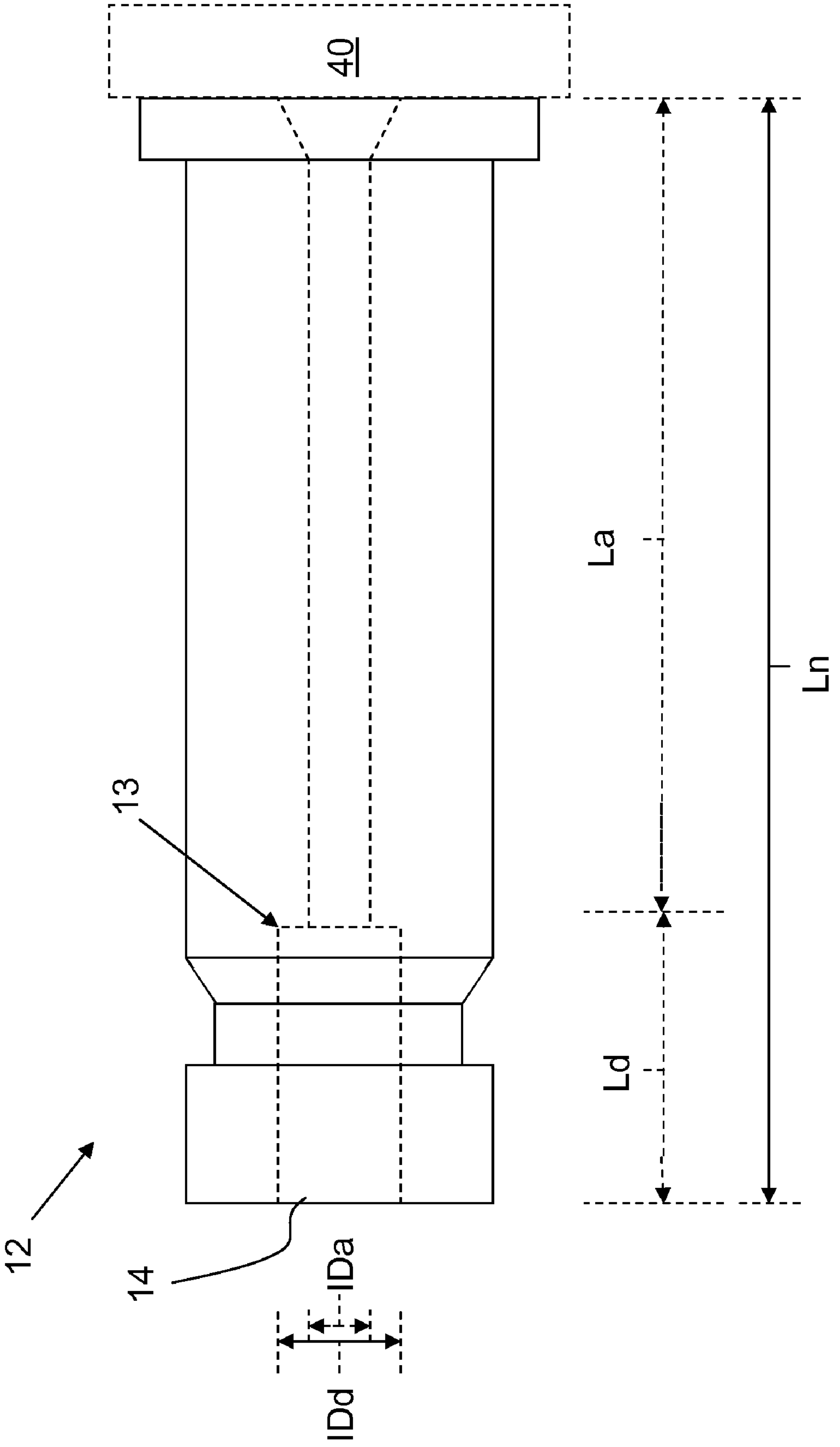
FIG. 2 shows a side view of a plasma spray gun nozzle according to an embodiment of the invention.

The power of a plasma spray gun is partly driven by the length of its plasma "arc" (arc length). The arc length is a component of the total length of plasma spray gun nozzle 12. Turning to FIG. 2, a side view of one embodiment of plasma spray gun nozzle 12 (nozzle) is shown. Also included in FIG. 2 is a portion of electrode body 40 (shown in phantom). Nozzle 12 may have an inner diameter of its arc portion (IDa), and an inner diameter of its divergent portion (IDd). In one embodiment, nozzle 12 may have an IDa of approximately 0.348 inches, and an IDd of approximately 0.602 inches. Inner diameter of the arc portion (IDa) will affect the exit velocity of the plasma gas leaving exit annulus 14, and will also affect the velocity of the sprayed materials at impact on specimen 110. In one embodiment, for higher velocity operation, IDa may be approximately 0.275 inches.

As shown in FIG. 2, plasma spray gun nozzle 12 has a total length (Ln), which includes an arc length (La) and a divergence length (Ld). Arc length (La) is the portion of total length (Ln) over which the plasma arc is formed, and extends between the electrode (within electrode body 40) and an arc root attachment 13. As described with reference to FIG. 1, plasma gas is heated due to the electrical potential difference (or arc voltage) between the electrode (within electrode body 40) and arc root attachment 13. The plasma gas then expands and/or cools over divergent length (Ld) before it is released from plasma spray gun apparatus 10 (FIG. 2) and impacts specimen 110 (FIG. 1). Divergent length (Ld) is chosen in order to prevent the arc root from extending beyond exit annulus 14. The power output of plasma gun apparatus 10 is partially dependent on the arc voltage, which in turn is partially dependent on arc length (La). As such, in order to reduce the power output of plasma spray gun apparatus 10, a smaller arc length (La) may be required. Conversely, to increase the power output of a plasma spray gun, a larger arc length (La) may be required. However, modifying the total length (Ln) of plasma spray gun nozzle 12 requires modifying the overall length (L1) of plasma spray gun apparatus 5 (FIG. 1). In order to maintain the length of plasma spray gun body 20 while modifying the arc length (La) of plasma spray gun nozzle 40, one or more couplers 30, 50 (FIGS. 3-5) may be used. It is understood that plasma spray gun body 20 may include a water sleeve (not shown) at least partially surrounding nozzle 12, to allow for coolant to flow around the exterior of nozzle 12. However, depiction and description of the water sleeve have been omitted from this description for the purposes of clarity.

Figure 3:
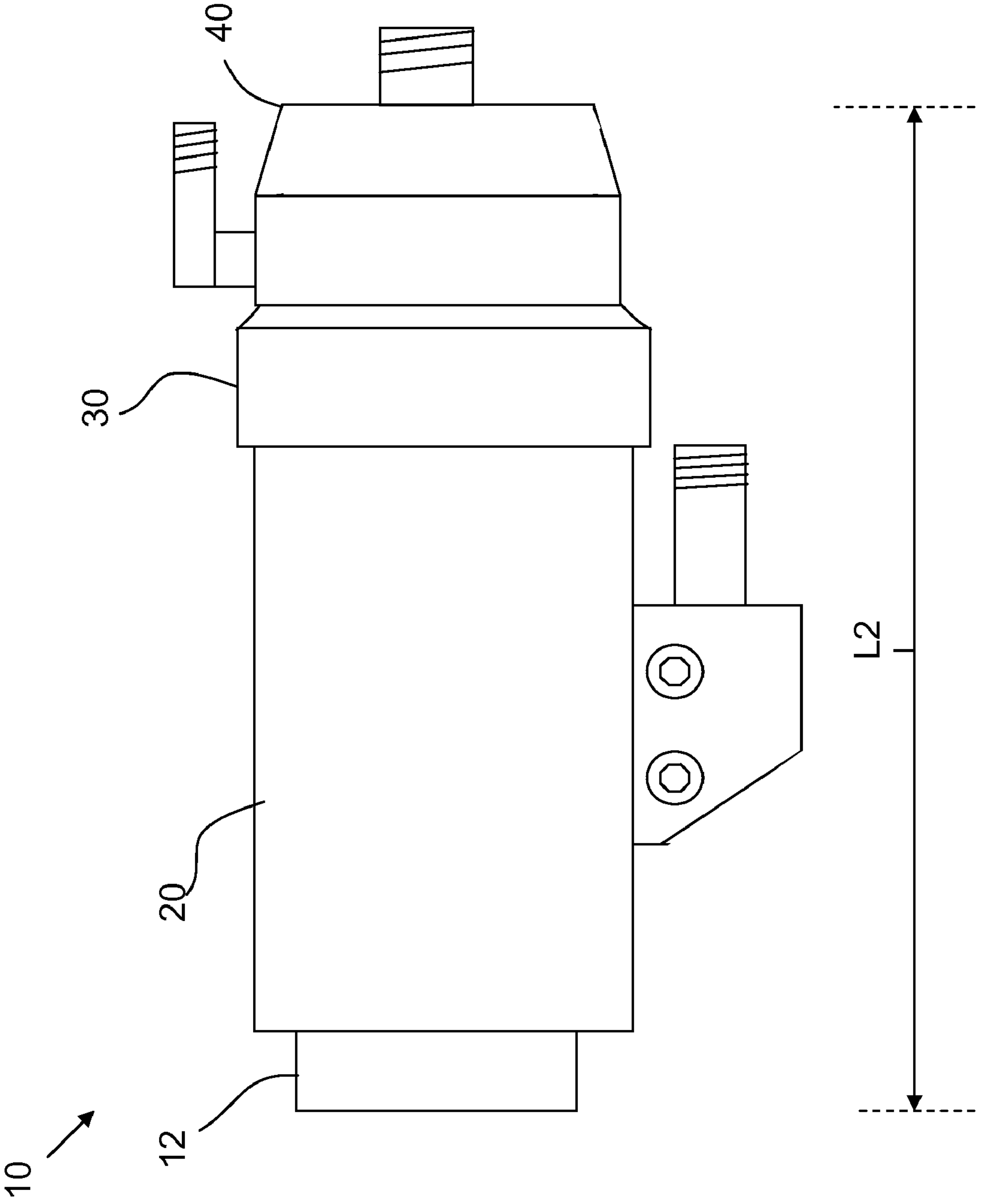
FIG. 3 shows a side view of an adjustable plasma spray gun apparatus according to an embodiment of the invention.
Figure 6:
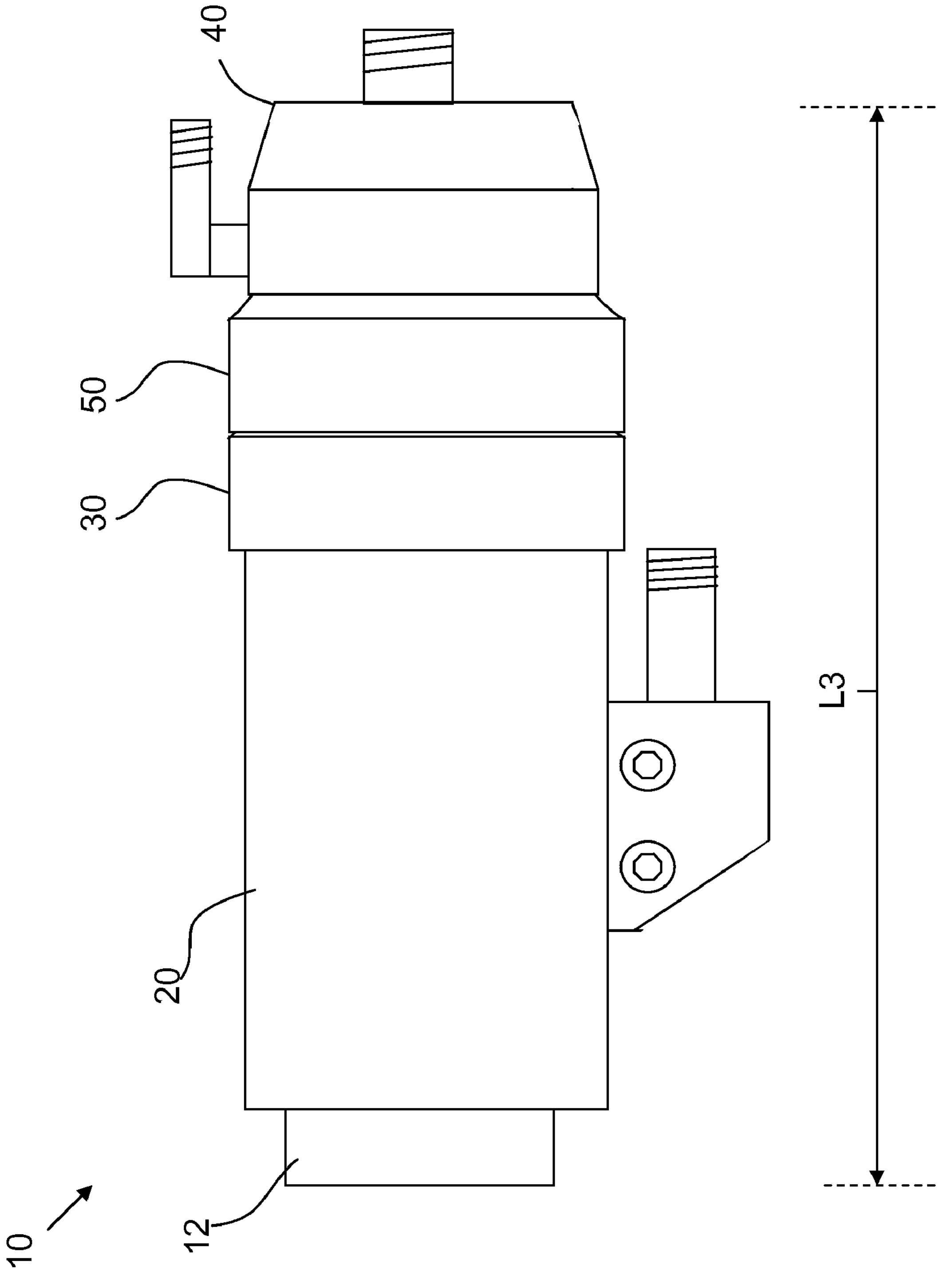
FIG. 6 shows a side view of an adjustable plasma spray gun apparatus according to an embodiment of the invention.

Turning to FIG. 3, a side view of one embodiment of an adjustable plasma spray gun apparatus 10 is shown. Adjustable plasma spray gun apparatus 10 may include plasma spray gun body 20 housing nozzle 12, a coupler 30 and an electrode body 40 housing an electrode. In this embodiment, adjustable plasma spray gun apparatus 10 may have a total length L2, which is greater than the total length L1 shown and described with reference to FIG. 1 In one embodiment, where adjustable plasma spray gun apparatus 10 has a length L1 (FIG. 1), it may produce a minimum power level (e.g., 50 kW). In contrast, in another embodiment, where adjustable plasma spray gun apparatus 10 has a length L2), it may produce a greater power level (e.g., 100 kW, 150 kW). It is understood that in different embodiments of the invention, adjustable plasma spray gun apparatus 10 may produce an even greater power level (e.g., 200 kW), and have a different length (L3)(FIG. 6). Power levels of adjustable plasma spray gun apparatus 10 may be manipulated using one or more couplers 30, 50 (FIG. 6), one of a plurality of plasma spray gun nozzles 12 (FIG. 7).

Figure 4:
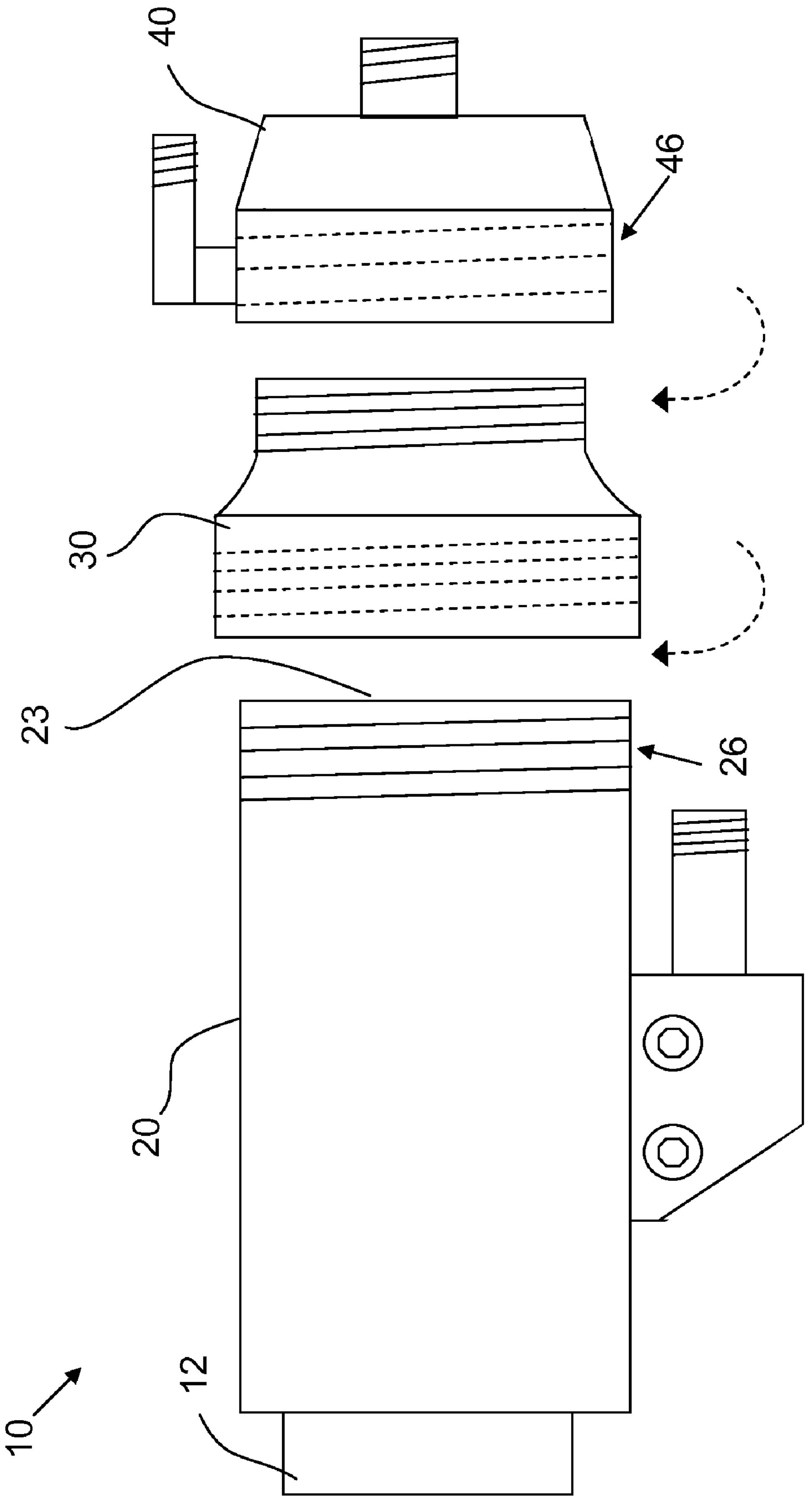
FIG. 4 shows a side view of components of an adjustable plasma spray gun apparatus according to an embodiment of the invention.

Turning to FIG. 4, a side view of separated components of adjustable plasma spray gun apparatus 10 is shown. As shown in FIG. 4, adjustable plasma spray gun apparatus 10 may include plasma spray gun body 20 housing nozzle 12, coupler 30 and electrode body 40 housing an electrode. Components of adjustable plasma spray gun apparatus 10 are shown separated, and not in their functional state, for illustrative purposes. However, as indicated by the dashed arrows, coupler 30 is configured to removably attach to plasma spray gun body 20. Further, electrode body 40 is configured to removably attach to either coupler 30 (as shown), or directly to plasma spray gun body 20 (not shown). In one embodiment, plasma spray gun body 20 may have an axial opening 23, and may include a plurality of external threads 26 for removably attaching to coupler 30 or electrode body 40. External threads 26 may be complementary to internal threads of coupler 30 (FIG. 5A) and electrode body 40. In one embodiment, plasma spray gun apparatus 10 is configured to operate at approximately 70 percent thermal efficiency and greater than approximately 70 percent deposition efficiency throughout a plasma spray gun apparatus power range of approximately 50 kW to approximately 200 kW. That is, in this embodiment, plasma spray gun body 20 may remain affixed on a robotic arm or the like, while performing efficient plasma spraying at a wide range of power modes.

Figures 5A, 5B:
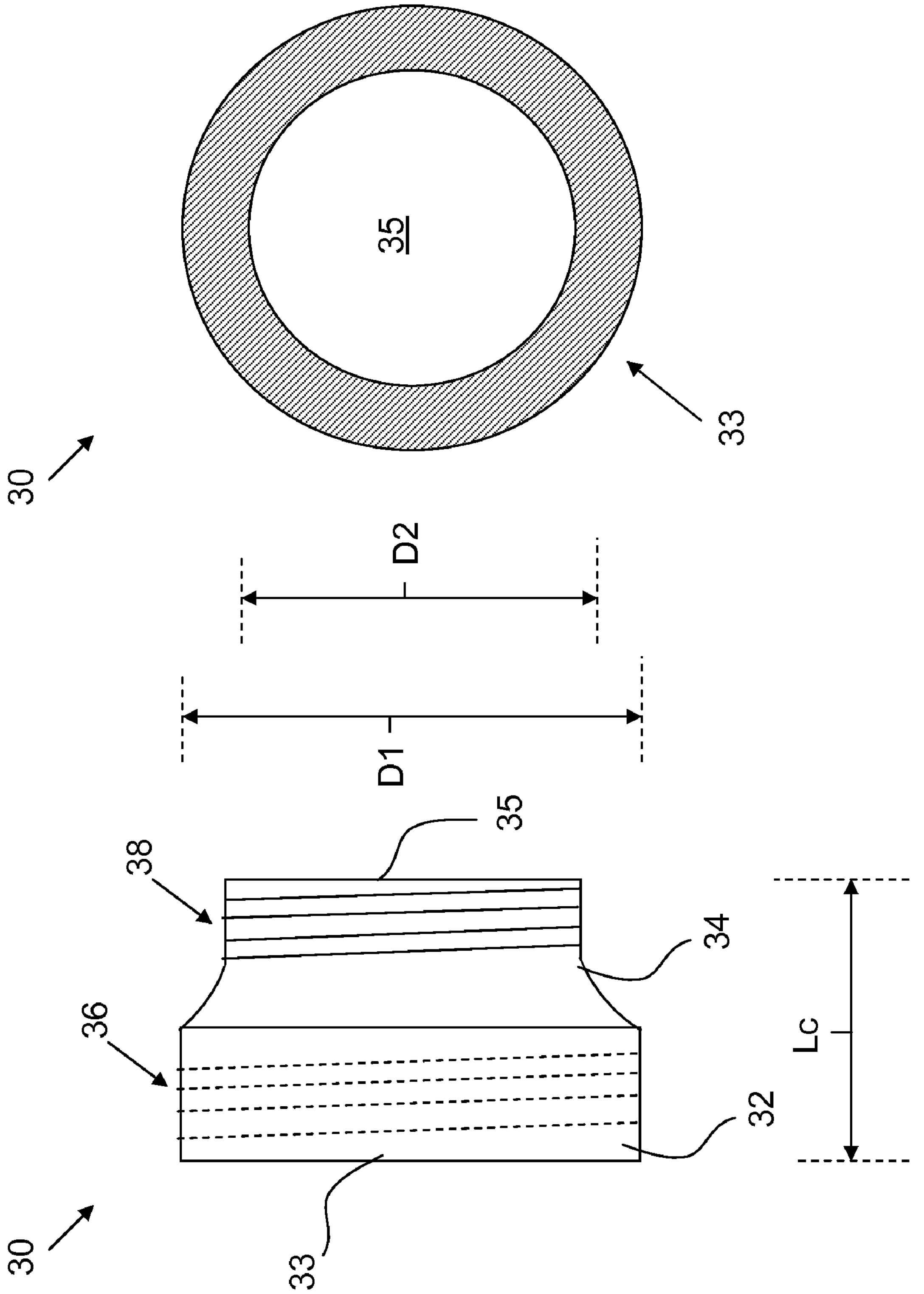
FIG. 5A shows a side view of a coupler according to an embodiment of the invention.
FIG. 5B shows a cross-sectional front view of the coupler of FIG. 4B.

Turning to FIGS. 5A and 5B, a side view and a cross-sectional front view, respectively, of coupler 30 are shown. FIGS. 5A-5B show one embodiment of coupler 30, including a first portion 32 having a first axial opening 33 including a plurality of internal threads 36. In this embodiment, first portion 32 may be configured to removably attach to plasma spray gun body 20 via plurality of internal threads 36 (of coupler 30) and external threads 26 of plasma spray gun 20 (FIG. 4). In this embodiment plasma spray gun body 20 may remain affixed to, for example, a robotic arm, while coupler 30 is rotatably affixed to gun body 20. This may involve, for example, a human operator physically rotating first portion 32 about external threads 26 of plasma spray gun body 20. It is understood that while components of adjustable plasma spray gun apparatus 10 (FIG. 4) are shown and described herein as being removably attached to one another via complementary threads, other forms of removable attachment are possible. For example, components of adjustable plasma spray gun apparatus 10 may be removably attached to one another via bayonet-type connectors or other suitable connectors. In one embodiment, coupler 30 may have a major diameter D1 (first portion 32) of approximately 2.745 inches (in) and a minor diameter D2 (second portion 34) of approximately 2.375 in. In this embodiment, coupler 30 may further have a length (Lc) of approximately 1.373 inches. It is understood that multiple couplers 30 may be used to extend the length (L) of adjustable plasma spray gun apparatus 10, and that couplers having different lengths (Lc) may be used alone, or in conjunction with additional couplers 50 (FIG. 5).

With continuing reference to FIGS. 5A-5B, and FIG. 4, coupler 30 is further shown including a second portion 34, having a second axial opening 35. In one embodiment, coupler 30 may include a plurality of external threads 38. In this case, second portion 34 may be configured to removably attach to one of electrode body 40 or a second coupler (not shown) via external threads 38 and internal threads 46 of electrode body 40. It is understood, however, that second portion 34 may be configured to removably attach to one of electrode body 40 or a second coupler via any means described with respect to first portion 32 and plasma spray gun body 20. Further, second portion 34 and first portion 32 may removably attach to other components of adjustable plasma spray gun apparatus 10 in manners distinct from one another. For example, first portion 32 may include a plurality of external threads, while second portion 34 may include another attachment mechanism (e.g., portions of a clasping mechanism, apertures for receiving screws or bolts, a bayonet-type connection etc.). In the case that second portion 34 includes external threads 38, internal threads 46 of electrode body 40 may complement external threads 38 of coupler 30, as well as external threads 26 of plasma spray gun body 20. Further, multiple couplers 30 may be removably attached to one another via, for example, their internal threads 36 and external threads 38, respectively, which complement each other. That is, the length (L1) of adjustable plasma spray gun apparatus 10 may be manipulated by the addition or subtraction of one or more couplers 30 to plasma spray gun body 20.

For example, as shown in FIG. 6, in one embodiment, adjustable plasma spray gun apparatus 10 may include plasma spray gun body 20 housing nozzle 12, first coupler 30, a second coupler 50, and electrode body 40. In this embodiment, second coupler 50 may be removably attached to first coupler 30 and electrode body 40. In one embodiment, second coupler 50 may be removably attached to first coupler 30 and electrode body 40 via internal and external threads (not shown), respectively. Second coupler 50 may have a substantially similar attachment mechanism (e.g., threads, clasps, bayonet-type connections, etc.) as first coupler 30, which may facilitate attachment of first coupler 30 and second coupler 50. Second coupler 50 may be substantially similar in length to first coupler 30, or may have a substantially different length (Lc) than first coupler 30. In one embodiment, second coupler 50 may have a length (Lc) approximately twice that of first coupler 30. In another embodiment, second coupler 50 may have a length (Lc) of approximately 2.183 inches, this length being less than twice that of first coupler 30. In any case, second coupler 50 may allow for extension of adjustable plasma spray gun apparatus 10 to a length L3. As described herein, adjusting the length (L1, L2, L3) of plasma spray gun apparatus 10 may allow for increased or decreased power output, which may accommodate plasma spraying of a range of parts and materials without the need to remove plasma spray gun body 20 from robotic arm 114 (or the like). This may also for adjusting the length (L1, L2, L3) of plasma spray gun apparatus 10 from the aft portion (opposite exit annulus 14) without changing the designed standoff distance SD.

Turning to FIG. 7, a table 100 illustrating performance-related aspects of embodiments of the present invention is shown. In particular, FIG. 7 illustrates a plurality of example plasma spray nozzles with various arc lengths that are possible using the plasma spray gun apparatus 10 of the present invention. As shown, a plurality of plasma spray gun nozzles 12 (e.g., Nozzles 50, 100, etc.) are compatible with plasma spray gun apparatus 10. The plurality of plasma spray gun nozzles 12, used in conjunction with one or more couplers 30, 50 may allow for an operator (not shown) to modify the power output of plasma spray gun apparatus 10 while not modifying the designed standoff distance SD. For example, Nozzle 150 may be used to produce a power output of approximately 150 kW, while Nozzle 50 may be used to produce a power output of approximately 50 kW., one-third the amount used with Nozzle 150. It is understood that plasma spray gun nozzles 12 may be interchanged to achieve thermal efficiency of approximately 70 percent, while maintaining deposition efficiency at or above approximately 70 percent, at a range of different plasma spray power levels (e.g., 100 kW to 200 kW). Different embodiments of plasma spray gun apparatus 10 may be assembled without removal of plasma spray gun body 20 from robotic arm 114 or the like (while maintaining SD), and assembly may be performed in approximately 3-5 minutes by an operator. These configurations may provide for efficient and fast plasma spraying of a variety of surfaces.

Figure 8:
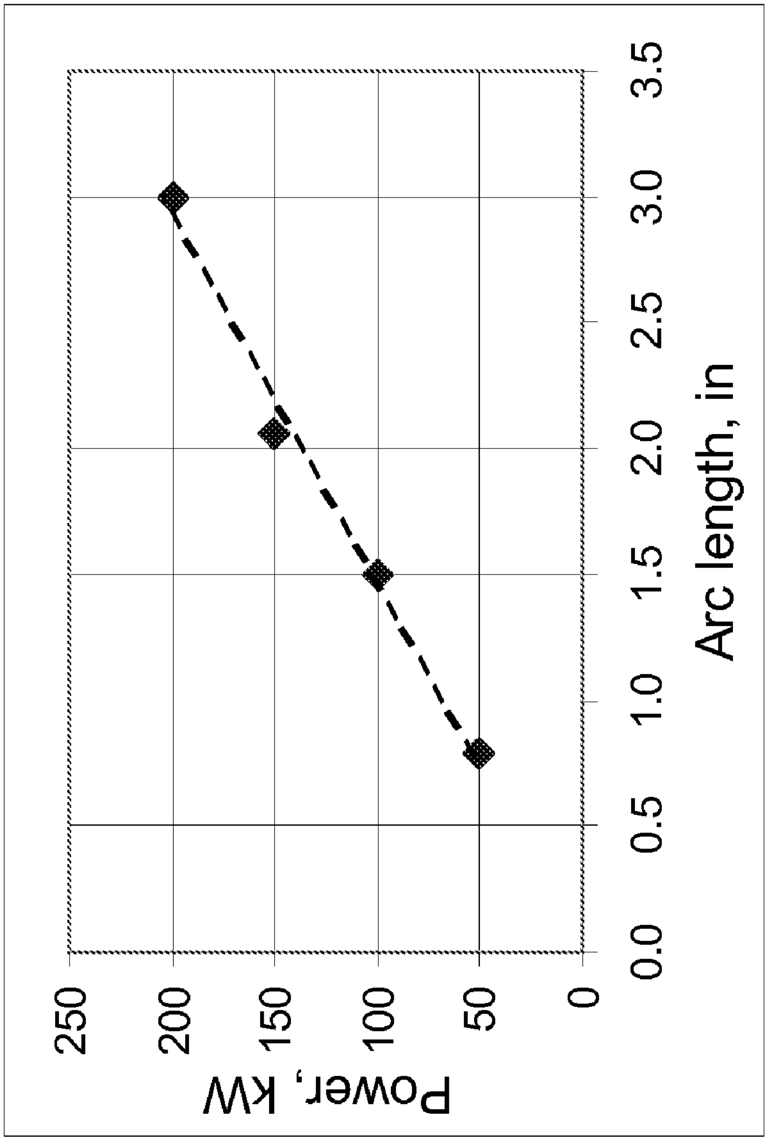
FIG. 8 shows a graph including data about example nozzles used according to embodiments of the invention.

FIG. 8 shows a graph 200, illustrating power versus arc length data as measured according to embodiments of the invention listed in table 100 (FIG. 7). Four data points are illustrated in graph 200, corresponding to power levels and arc lengths, respectively, of: 50 kW, 0.79 in; 100 kW, 1.50 in; 150 kW, 2.06 in; and 200 kW, 3.00 in.

It should be emphasized that the preceding figures and written description include examples of embodiments of an adjustable plasma spray gun. It is understood that specific numerical values (e.g., physical dimensions, power levels, etc.) are included merely for illustrative purposes, and are not limiting. The teachings of this written description may be applied to plasma spray gun systems having, for example, different sized components functioning at different power levels than those described herein and/or illustrated in the figures.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An adjustable plasma spray gun apparatus comprising:
- a plasma spray gun body having a fore portion and an aft portion; and
- a first coupler configured to removably attach to the plasma spray gun body at the aft portion, the coupler including:
  - a first portion having a first axial opening configured to removably attach to the plasma spray gun body at the aft portion; and
  - a second portion having a second axial opening configured to removably attach to one of an electrode body or a second coupler.

2. The adjustable plasma spray gun apparatus of claim 1, wherein the electrode body includes:
- a first axial opening configured to removably attach to the second portion of the first coupler.

3. The adjustable plasma spray gun apparatus of claim 1, wherein the plasma spray gun body has an axial opening at the aft portion including a plurality of threads which are complementary to a plurality of threads of the first coupler, the plasma spray gun body being configured to removably attach to the first coupler via the threads of the plasma spray gun body and the threads of the first portion of the first coupler.

4. The adjustable plasma spray gun apparatus of claim 1, further comprising a first nozzle at least partially housed within the plasma spray gun body, wherein the first nozzle has an overall length, and arc length, respectively, selected from the group consisting of:
- approximately 4.12 inches (104.6 mm) and approximately 3.00 inches (76.2 mm);
- approximately 3.31 inches (84.1 mm) and approximately 2.06 inches (52.3 mm);
- approximately 2.50 inches (63.5 mm) and approximately 1.50 inches (38.1 mm); and
- approximately 1.69 inches (42.9 mm) and approximately 0.79 inches (20.1 mm).

5. The adjustable plasma spray gun apparatus of claim 1, wherein the second portion is removably attached to the second coupler, the second coupler having:
- a first portion having a first axial opening configured to removably attach to the first coupler; and
- a second portion having a second axial opening configured to removably attach to one of the electrode body or a third coupler.

6. The adjustable plasma spray gun apparatus of claim 5, wherein the second coupler has an overall length substantially distinct from the overall length of the first coupler.

7. The adjustable plasma spray gun apparatus of claim 1, wherein the first coupler is tapered from the first portion toward the second portion.

8. The adjustable plasma spray gun apparatus of claim 1, wherein the first axial opening of the coupler is larger than the second axial opening.

9. The adjustable plasma spray gun apparatus of claim 1, wherein the plasma spray gun body and the coupler are configured to:
- generate a plasma spray while operating in a power range of approximately 50 kW to approximately 200 kW; and
- remain at a fixed standoff distance from a specimen while operating in the power range of approximately 50 kW to approximately 200 kW.

10. An adjustable plasma spray gun comprising:
- an electrode body housing an electrode;
- a plasma spray gun body having a fore portion and an aft portion, the aft portion having an axial opening configured to removably attach to one of the electrode or a first coupler; and
- the first coupler removably attached to the plasma spray gun body at the axial opening of the plasma spray gun body, the coupler including:
  - a first portion having a first axial opening configured to removably attach to the plasma spray gun body; and
  - a second portion having a second axial opening configured to removably attach to one of the electrode body or a second coupler.

11. The adjustable plasma spray gun of claim 10, further including a plasma spray gun nozzle at least partially housed within the plasma spray gun body.

12. The adjustable plasma spray gun of claim 11, wherein the plasma spray gun nozzle has an overall length, and arc length, respectively, selected from the group consisting of:
- approximately 4.12 inches (104.6 mm) and approximately 3.00 inches (76.2 mm);
- approximately 3.31 inches (84.1 mm) and approximately 2.06 inches (52.3 mm);
- approximately 2.50 inches (63.5 mm) and approximately 1.50 inches (38.1 mm); and
- approximately 1.69 inches (42.9 mm) and approximately 0.79 inches (20.1 mm).

13. The adjustable plasma spray gun of claim 10, wherein the second portion is removably attached to the second coupler, the second coupler having:
- a first portion including a first axial opening configured to removably attach to the first coupler; and
- a second portion having a second axial opening configured to removably attach to one of the electrode body or a third coupler.

14. The adjustable plasma spray gun of claim 13, wherein the second coupler has an overall length substantially distinct from the overall length of the first coupler.

15. The adjustable plasma spray gun of claim 10, wherein the coupler is tapered from the first portion toward the second portion.

16. The adjustable plasma spray gun of claim 10, wherein the electrode body, the plasma spray gun body and the coupler are configured to:

generate a plasma spray while operating in a power range of approximately 50 kW to approximately 200 kW; and remain at a fixed standoff distance from a specimen while operating in the power range of approximately 50 kW to approximately 200 kW.

17. An adjustable plasma spray gun system comprising:

an electrode body housing an electrode;

a plasma spray gun body having a fore portion and an aft portion, the plasma spray gun body housing a nozzle and having an axial opening at the aft portion configured to removably attach to one of the electrode or a coupler;

the coupler removably attached to the plasma spray gun body at the axial opening of the plasma spray gun body, the coupler including:

a first portion having a first axial opening configured to removably attach to the plasma spray gun body at the aft portion; and a second portion having a second axial opening configured to removably attach to one of the electrode body or a second coupler.

18. The adjustable plasma spray gun system of claim 17, further comprising a robotic arm attached to the plasma spray gun body.

19. The adjustable plasma spray gun system of claim 18, wherein the electrode body, the plasma spray gun body, the coupler and the robotic arm are configured to:

generate a plasma spray while operating in a power range of approximately 50 kW to approximately 200 kW; and remain at a fixed standoff distance from a specimen while operating in the power range of approximately 50 kW to approximately 200 kW.

20. The adjustable plasma spray gun system of claim 19, wherein the nozzle has an exit annulus at the fore portion of the plasma spray gun body, and wherein the standoff distance is approximately equal to the distance between the exit annulus and a specimen.

* * * * *